United States Patent [19]

Nguyen

[11] Patent Number: 5,721,565
[45] Date of Patent: Feb. 24, 1998

[54] ZOOMING PROTECTION DISPLAY CONTROL SYSTEM AND METHOD OF USING SAME

[75] Inventor: Hung H. Nguyen, Poway, Calif.

[73] Assignee: Proxima Corporation, San Diego, Calif.

[21] Appl. No.: 486,105

[22] Filed: Jun. 7, 1995

Related U.S. Application Data

[63] Continuation of Ser. No. 286,010, Aug. 4, 1994, abandoned, which is a continuation-in-part of Ser. No. 237,013, Apr. 29, 1994, Ser. No. 235,292, Apr. 29, 1994, and Ser. No. 247,720, May 23, 1994.

[51] Int. Cl.$^6$ ................................................ G09G 5/00
[52] U.S. Cl. ................................. 345/127; 345/132
[58] Field of Search .................................. 345/127, 128, 345/129, 130, 132, 143, 131, 202, 203, 1, 3; 382/232, 233

[56] References Cited

U.S. PATENT DOCUMENTS

| Re. 33,316 | 8/1990 | Katsuta et al. | 382/232 |
|---|---|---|---|
| 4,367,533 | 1/1983 | Wiener | 345/128 |
| 4,646,078 | 2/1987 | Knierim et al. | 345/203 |
| 4,881,069 | 11/1989 | Kameda et al. | 345/128 |
| 5,600,347 | 2/1997 | Thompson et al. | 345/127 |

Primary Examiner—Regina Liang
Attorney, Agent, or Firm—Bernard L. Kleinke; Peter P. Scott

[57] ABSTRACT

A logic arrangement for causing a display image of a given resolution to be displayed in an adjusted size to accommodate a projection display system, which, in turn, can project the adjusted image. The system also enables an image to be zoomed in size prior to projecting it.

28 Claims, 11 Drawing Sheets

FIG. 8

F(0) EVEN COLUMNS (5 TO 4)

PANEL PIXELS PP
VIDEO RAM PIXELS VP

| PANEL PIXELS PP | 1 | - | 4 | 7 | - | 9 | — | 1020 | 1023 | — |
| VIDEO RAM PIXELS VP | 1 | 4 5 | 8 | | 1274 1275 | 1278 1279 1280 |

PANEL LINES PL / VIDEO RAM LINES VL:
1 — 1
2 — 2
3 — 2
4 — 3

LINES (2 TO 3):
716 — 478
717 — 478
718 — 479
719 — 480
720 — 480
721 — 481

764 — 510
765 — 510
766 — 511
767 — 512
768 — 512

ZOOMING PROTECTION DISPLAY CONTROL SYSTEM AND METHOD OF USING SAME

CROSS REFERENCE TO RELATED APPLICATIONS

This application is a continuation of application Ser. No. 08/286,010, filed Aug. 4, 1994, now abandoned, which is a continuation-in-part patent application of both U.S. patent application Ser. No. 08/237,013 filed Apr. 29, 1994, entitled "DISPLAY CONTROL SYSTEM AND METHOD OF USING SAME," and U.S. patent application Ser. No. 08/235,292 filed on Apr. 29, 1994, entitled "METHOD AND DISPLAY CONTROL SYSTEM FOR PANNING," and U.S. patent application Ser. No. 08/247,720 filed on May 23, 1994, entitled "METHOD AND DISPLAY CONTROL SYSTEM FOR ACCENTUATING", which applications are incorporated herein by reference as though fully set forth.

TECHNICAL FIELD

The present invention relates in general to a display control system and method of controlling the display of information images. The invention more particularly relates to a display control system and method of controlling a display to enable various size images from various sources, such as personal computers, and others, to be expanded in size to conform to a give in size display for projecting the expanded image.

BACKGROUND ART

In the past, there have been many different types and kinds of projection display equipment for displaying video signals from a computer or from other video sources, such as a video recorder. For example, the display system disclosed in the foregoing mentioned patent application relate to a display panel connected to a computer, such as a personal computer, for generating an image under computer control, and then the image is projected onto a viewing area by means of an overhead projector. In this regard, the projection panel is adapted to be positioned on the stage of an overhead projector, and is connected electrically to a computer so that an enlarged image may be projected onto a remote viewing area, such as a screen, to be viewed by a large number of people simultaneously.

As disclosed in the foregoing patent applications, the display system enables a high resolution image, such as one produced by a workstation, to be compressed to a convenient size for a projection display panel used with the overhead projector. In this manner, the high resolution compressed image could then be projected and viewed by a large number of people for presentation purposes.

While such a system has proven to be highly successful in its operation, it would be worthwhile to enable such a system to be compatible with a variety of different computers each having different resolutions. For example, it would be highly desirable to enable the projection display system to not only be compatible with a workstation, but also with a personal computer.

In addition to the ability to be compatible with a variety of different computers, it would also be highly desirable to enable the projection display system to provide a zoom function. In this regard, the system should be able to zoom from a small size image to an enlarged image in a convenient manner, such as by means of a remote control arrangement. Such a system should be relatively inexpensive to manufacture, and should be able to operate "on the fly" as the video images are being presented to the projection system. In this regard, the system should be compatible with not only computers, but also video recorders and live television video signals.

DISCLOSURE OF INVENTION

Therefore, the principal object of the present invention is to provide a new and improved projection display control system and method of using it to enable various size images from various sources, such as personal computers, video recorders and others, to be expanded in size to conform to a given size display system for projecting the expanded image.

Another object of the present invention is to provide such a new and improved projection display control system and method of using it to enable zooming of the image to be projected in a fast and convenient manner.

Briefly, the above and further objects of the present invention are realized by providing a new and improved display control system which includes a logic arrangement for causing a display image of a given resolution to be displayed in an adjusted size to accommodate a projection display system, which, in turn, can project the adjusted image. The system also enables an image to be zoomed in size prior to projecting it.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIGS. 8 and 9 are fragmentary diagrammatic views of the liquid crystal display panel of FIG. 1, illustrating the alternating elimination of adjacent vertical pixel information to scale down the columns of displayed information and the alternating repetition of horizontal pixel information to scale up the lines of displayed information.

BEST MODE FOR CARRYING OUT THE INVENTION

Figure 1:
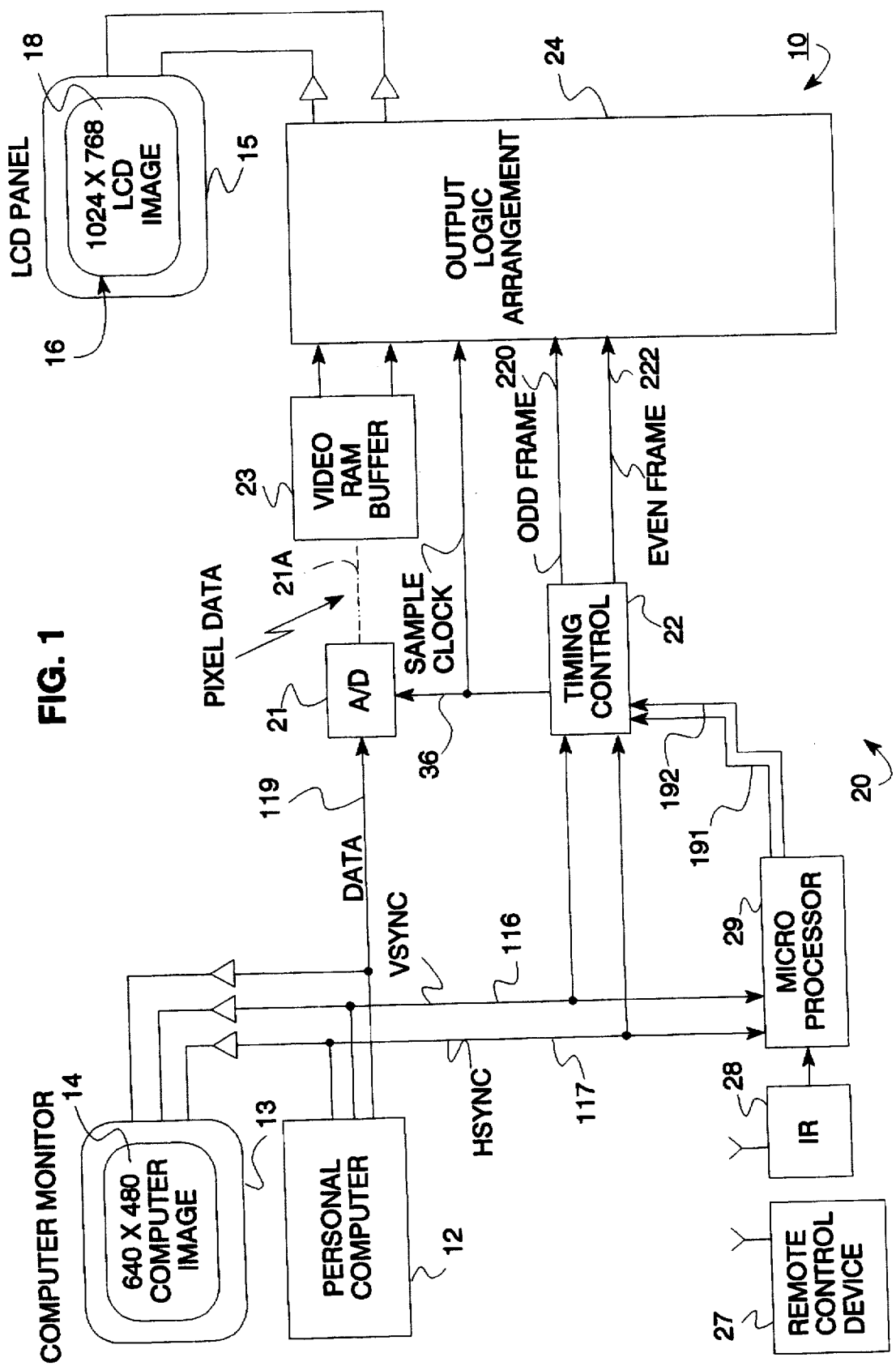
FIG. 1 is a block diagram of a display control system which is constructed in accordance with the present invention.

Referring now to the drawings and more particularly to FIG. 1 thereof, there is shown a display control system 10 which is constructed in accordance with the present invention. The display control system 10 is adapted to be coupled between a video signal producing device, such as a personal computer 12 having a monitor 13, and a display device, such as a liquid crystal display unit 15. While the preferred embodiment of the present invention describes the use of a personal computer 12, it will be understood by one skilled in the art that other devices including both high and low resolution devices will also perform satisfactorily. The liquid crystal display unit 15 includes a liquid crystal panel 16 (FIGS. 1-3) having a 1024×768 matrix array of pixel elements for displaying a monitor image 18. In this regard, the monitor image 18 can be either a virtually duplicated image 30 (FIG. 2) of a personal computer monitor image 14, or a zoomed image 31 (FIG. 3) of the personal computer monitor image 14. The duplicated image 30 is defined by a matrix array of pixel images arranged in n number of rows and m number of columns, while the zoomed image 31 is defined by a matrix array of pixel elements arranged in N numbers of rows and M number of columns. In this regard, the numbers m and M are about 640 and 1024 respectively, while the numbers n and N are about 480 and 720 respectively.

From the foregoing, those skilled in the art will understand the display system 10 enables a user (not shown) to view an image from the liquid crystal display panel 16 as either a virtually duplicated image of the computer monitor image 14 arranged in a matrix array of 640×480 pixels, such as image 30, or as the corresponding zoomed image 31 arranged in a matrix array of 1024×720 pixels.

The display control system 10 generally includes a low speed sampling arrangement indicated generally at 20 that helps convert an incoming analog RGB video data signal 119 developed by the personal computer 12 into a pixel data signal 21A that is indicative of the 640×480 monitor image 14. In this regard, as will be explained hereinafter, the sampling arrangement 20 includes a low cost, low speed analog to digital converter arrangement indicated generally at 21 that has a sampling rate which is sufficient to sample all of incoming video data indicative of the 640×480 computer image at least once each frame time period.

The low speed sampling arrangement 20 also includes a timing control circuit 22 to develop various timing signals that enable the analog to digital converter arrangement 21 to convert the incoming video data signal 119 into pixel data 21A arranged in a proper format for display on the panel 16. From the foregoing, it should be understood by those skilled in the art that during any given frame time period, all of the pixel image information for any frame cycle is converted into pixel data.

The sampling arrangement 20 also includes a video RAM memory 23 that receives and stores the pixel data converted by the analog to digital converter 21. In this regard, the pixel data 21A is stored as an array having the dimensions m×n, where m is about 1024 and n is about 768 for displaying image 30, and m is about 1280 and n is about 512 for displaying zoomed image 31. It will be understood by one skilled in the art that dimensions m×n of the array described are the preferred dimensions. However, other dimensions are contemplated and are within the scope of the present invention.

Figure 2:
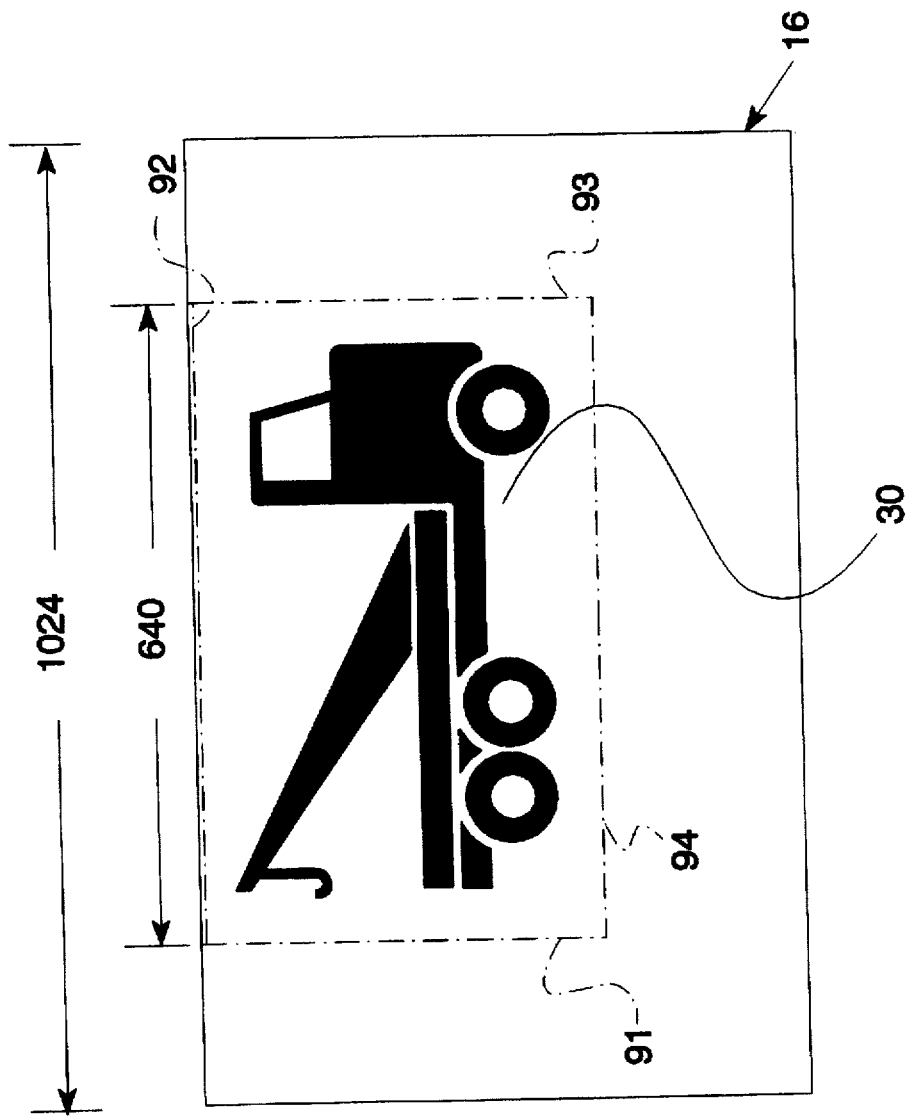
FIG. 2 illustrates a 640×480 low resolution personal computer monitor image displayed on a 1024×768 liquid crystal panel of FIG. 1.
Figure 3:
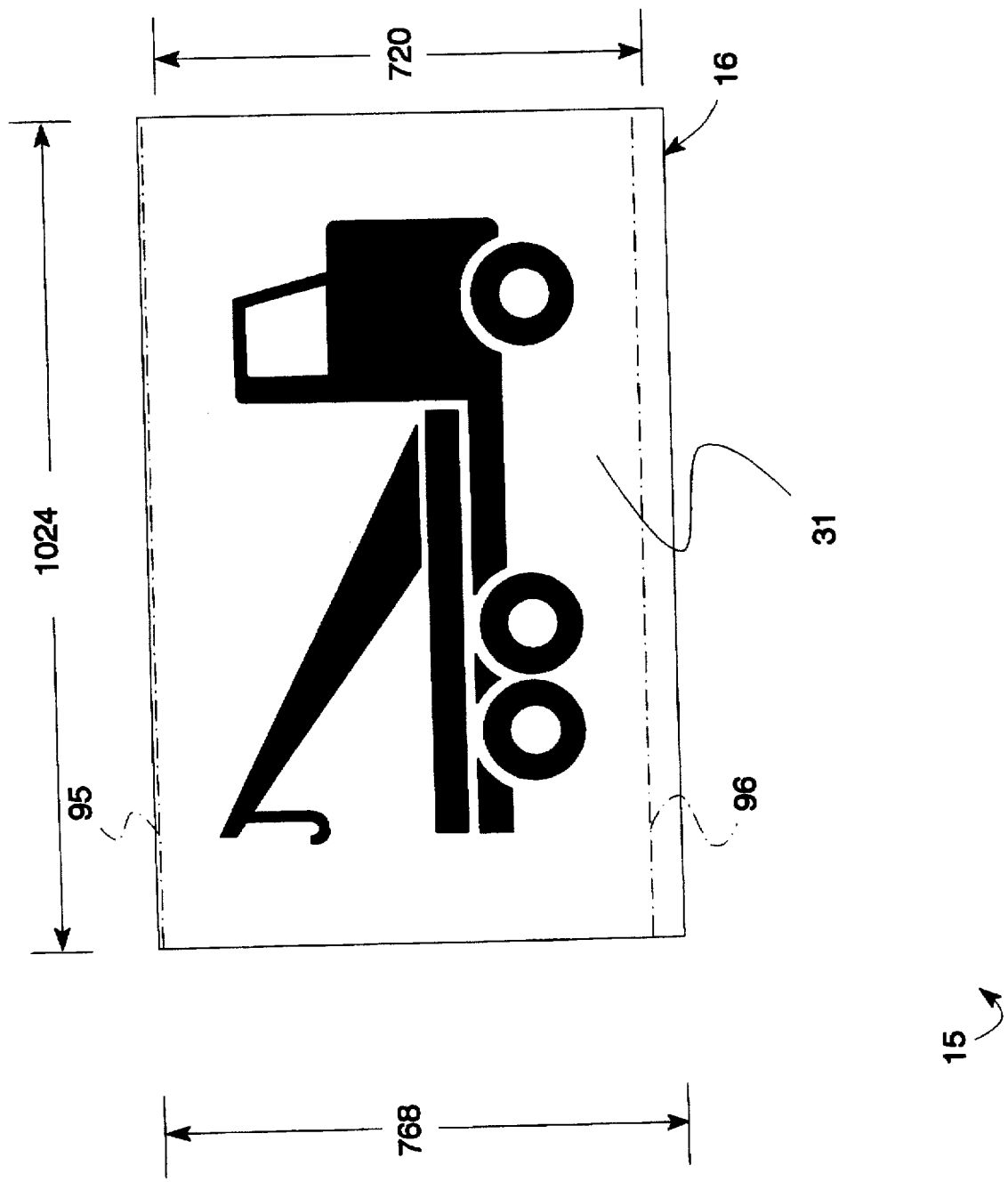
FIG. 3 illustrates a 640×480 low resolution personal computer monitor image displayed as a zoomed image on the 1024×768 low resolution liquid crystal panel of FIG. 2.

As will be explained hereinafter, in greater detail, as data is retrieved from the memory 23, it is formatted to be a centered 640×480 image, such as the image 30 displayed in the center of the upper portion of the 1024×768 array of the LCD panel 16, or it is formatted to be a zoomed 1024×720 image, such as the zoomed image 31, displayed at the top of the 1024×768 array. Both the centered image 30 and the zoomed image 31 correspond to the computer monitor image 14, where the centered image 30 has the same pixel image configuration of 640×480 pixel images as the computer monitor image 14, while the zoomed image 31 has an enlarged 1024×720 pixel image configuration. It will be understood by one skilled in the art that the location of image 30 in FIG. 2 and the location of zoomed image 31 in FIG. 3 are the preferred locations. Other locations within the panel 16 are possible and are contemplated in the present invention.

The display control system 10 also includes an output logic arrangement 24 which is responsive to the timing control circuit 22 for generating addressing or scaling signals to help either zoom the whole computer monitor image 14 into a zoomed image, such as the zoomed image 31, or to merely duplicate the whole computer monitor image 14 as a centered image, such as the centered image 30. In this regard, the output logic arrangement 24 enables the pixel data 21A to either be retrieved and displayed as 640×480 lines of display information, or to be scaled and displayed as 1024×720 lines of information, as will be explained hereinafter in greater detail.

The display control system 10 also includes a microprocessor 29 coupled to a remote control zoom device 27 via an infrared receiver 28, to cause the liquid crystal display panel 16 to display in response to input command signals generated by the device 27, either the centered 640×480 image, such as the centered image 30, or the zoomed image, such as the zoomed image 31.

In operation, the microprocessor 29 initially detects the format of the incoming analog video data 119 to determine the size of memory required to store the analog video data 119 which has been converted in the memory 23, for displaying both image 30 and zoomed image 31. The microprocessor subsequently assigns the required memory space of memory 23 for temporarily storing the analog video data 119 which has been converted, and clears the assigned memory space in preparation for receiving digital information representative of the image to be displayed on the panel 16.

After the required space of memory 23 has been cleared, the sampling arrangement 20 causes the incoming analog video data 119 to be stored in the predetermined locations in the memory 23. More particularly, the sampling arrangement 20 converts the video data signal 119 into digital pixel data 21A while the video data RAM memory 23 stores the pixel data 21A. As will be explained hereinafter, a user employing the remote control zoom device 27 can select either a duplicate of the monitor image 14 to be displayed as a centered 640×480 image, such as the centered image 30, or a zoomed 1024×720 image, such as the zoomed image 31.

Initially, the centered image 30 is displayed on panel 16. Whenever the user desires to zoom the centered image 30 displayed on the liquid crystal display panel 16, the user, via the remote control zoom device 27, causes a zoomed command signal to be transmitted to the microprocessor 29. In response to receiving the zoom command signal, the microprocessor 29 generates a zoom signal 191 to cause the centered image 30 displayed on the liquid crystal display panel 16 to be changed to the zoomed image 31. In this regard, the image changes from the centered image 30 having a 640×480 pixel format to a zoomed image 31 having a 1024×720 pixel format.

After the zoomed image 31 is displayed, the user, via the remote control zoom device 27, can cause a restore command signal to be transmitted to the microprocessor 29 to restore the centered image 30 so a duplicate image of the computer image 14 can be viewed. In this regard, the microprocessor 29 generates a restore signal 192 to cause the image 30 to be displayed.

From the foregoing, it will be understood that although a 1024×768 image can be displayed by the liquid crystal display panel 16, the size of image 30 does not fully correspond to the size of panel 16. In this regard, when a user causes the restore signal 192 to be generated, the centered image 30 will be displayed. The centered image 30 is defined by a 640×480 matrix array of pixel images disposed in the 1024×768 matrix array at columns 192 to 832, as defined by imaginary lines 91 and 93, respectively (FIG. 2), and lines 1 to 480, defined by imaginary lines 92 and 94, respectively.

In a similar manner, it will also be understood that when the user causes the zoom signal 191 to be generated, the zoomed image 31 will be displayed. The zoomed image is defined by a 1024×720 matrix array pixel image disposed in the 1024×768 matrix array at columns 1 to 1024, and lines 1 to 720, as defined by imaginary lines 95 and 96 respectively (FIG. 3). Although both images 30 and 31 are both positioned at the upper edge of panel 16 in the preferred embodiment of the present invention, one skilled in the art will understand that the images 30 and 31 can be centered between the upper and lower edges of panel 16.

Furthermore, while in the preferred embodiment of the present invention the displayed zoomed image 31 is defined by a 1024×720 matrix array of pixel images, those skilled in the art will understand other matrix arrays of different sizes are also contemplated and are within the scope of the invention.

Also in the preferred embodiment of the present invention, the video data signal 119 was defined as an analog signal. Those skilled in the art will understand that digital signals are also contemplated, thereby eliminating the need for conversion from an analog to a digital signal. In this regard, an analog to digital converter is not required as such digital signals can be gated directly into a video data RAM memory.

Figure 6:
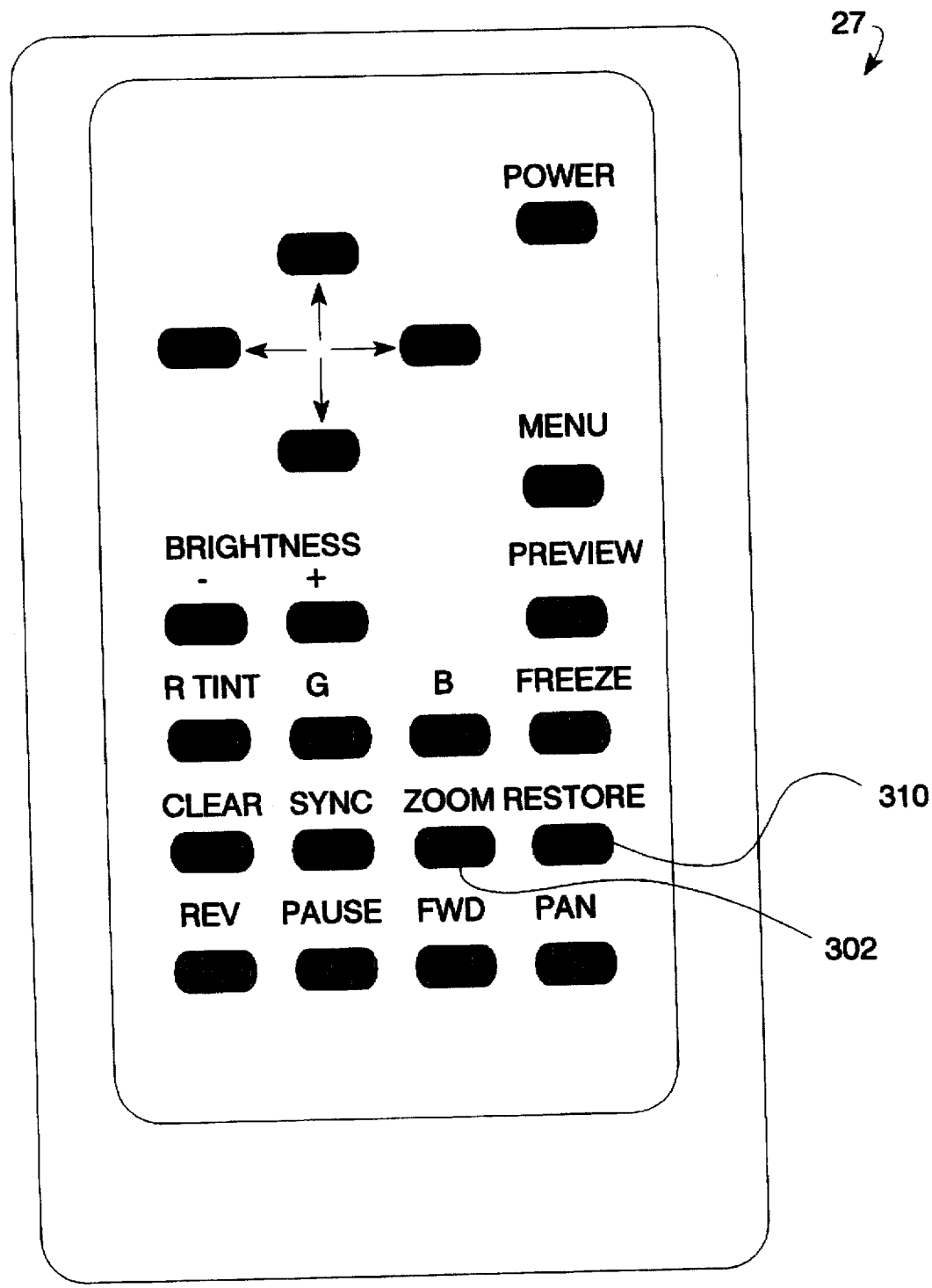
FIG. 6 is a greatly enlarged top plan view of the remote control device of FIG. 1.

Considering now the remote device 27 in greater detail with reference to FIG. 6, the remote device 27 generally includes a zoom up command key 302 which, when actuated, causes a zoom command to be sent to the microprocessor 29. In this regard, the microprocessor 29 will cause the centered image 30 as illustrated in FIG. 2 to be changed to the zoomed image 31 (FIG. 3) upon receipt of the zoom command.

The remote device 27 also includes a restore or zoom down key 310. In operation, by actuating the key 310, the zoomed down image 30 as illustrated in FIG. 2 can be achieved.

Figure 4:
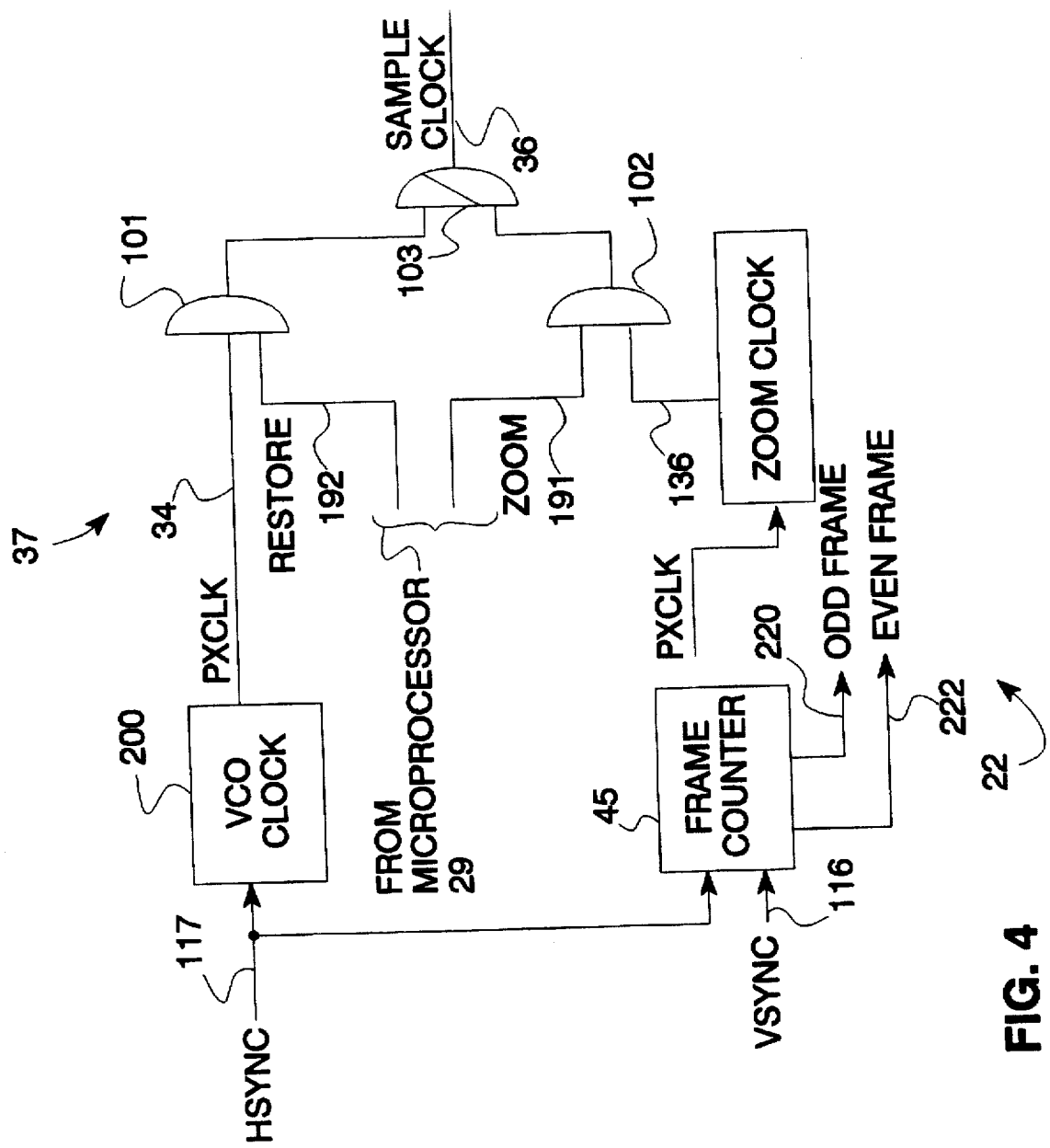
FIG. 4 is a block diagram of the timing control circuit of FIG. 1.

Considering now the low speed sampling arrangement 20 in greater detail with reference to FIG. 1 and 4, the sampling arrangement 20 includes the analog to digital converter arrangement 21 for converting the incoming analog red, green and blue video signals into digital signals. A sample clock signal 36 generated by a logic gating arrangement indicated generally at 37 (FIG. 4), enables the incoming analog signals to be converted at a variable rate that allows all of the pixel image data to be converted during odd frame time periods and all of pixel image data to be converted during even frame time periods. In this regard, the incoming analog signals are converted at a normal rate when duplicate image 30 is desired, and are converted at a zoomed rate when the zoomed image 31 is desired.

Figure 7:
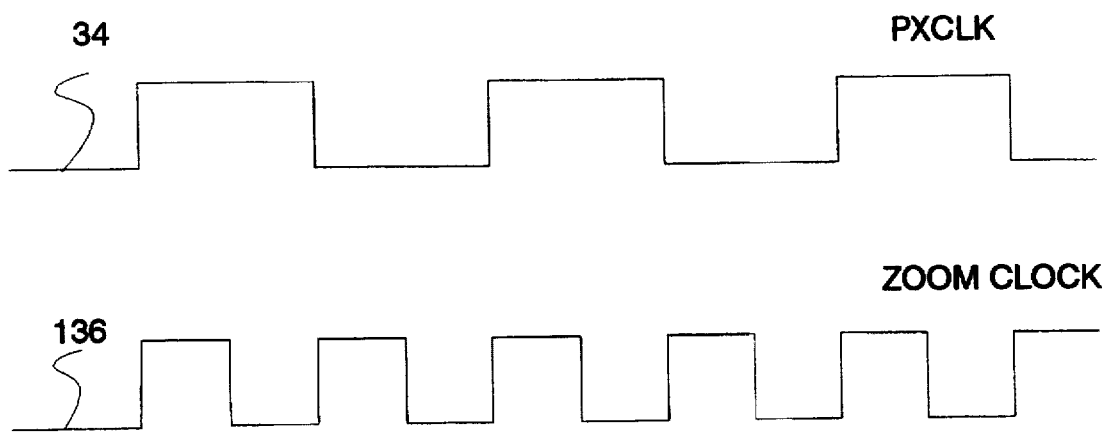
FIG. 7 is a timing diagram of the clock signals generated by the timing control circuit of FIG. 4.

Considering now the gating arrangement 37 in greater detail, the gating arrangement 37 generally includes a set of logic gates 101–103 to generate a SAMPLE CLOCK clock signal 36 to determine which pixel data is to be sampled or converted, as well as the rate at which the pixel data is to be sampled. The clock signal 36 is generated by the logic OR gate 103. Depending on whether restore mode or zoom mode has been selected, clock signal 36 will either be a PXCLK clock signal 34 from the gate 101 or a ZOOM CLOCK clock signal 136 from the gate 102, respectively. The ZOOM CLOCK clock signal 136 has a frequency which is substantially two times larger than the frequency of PXCLK clock signal 34, as best seen in FIG. 7. In this way, the input analog data 119 may be sampled during the zoom mode at twice the rate of the sampling during the restore mode. This results in the ability to sample the same pixel information two times, and then to store the same pixel information two times, side by side, in the memory 23. By doubling each piece of pixel information stored in the memory 23, a 640×480 image is converted into a 1280×480 image, which is then stored in the memory 23 for subsequent scaling operations, as will be discussed hereinafter in greater detail.

The gating arrangement 37 further includes a VCO CLOCK vertical count clock 200 connected to the HSYNC signal 117 to generate the PXCLK pixel clock signal 34. Pixel clock signal 34 cooperates with the restore command signal 192 from the microprocessor 29 at gate 101 to generate the restore mode input for the OR gate 103, wherein gate 101 generates a signal substantially equal to PXCLK clock signal 34.

The zoom command signal 191 from the microprocessor 29 cooperates with the ZOOM CLOCK signal 136 at gate 102 to generate the zoom mode input for the OR gate 103, wherein gate 102 generates a signal substantially equal to ZOOM CLOCK clock signal 136. The ZOOM CLOCK clock signal 136 is generated by any well known method or device for doubling the frequency of a pixel clock signal 36, such as PXCLK clock signal.

A frame counter 45 is connected to HSYNC signal 117 and VSYNC signal 116 to generate ODD FRAME signal 220 and EVEN FRAME signal 222 for varying the output data from output logic arrangement 24 according to the even or odd status of the video frame being operated on, as described hereinafter in greater detail.

In operation, either the restore signal 192 or the zoom signal 191 is activated. Where the restore signal 192 is activated, the gate 101 generates a restore mode signal substantially similar to PXCLK clock signal 34. Simultaneously, the gate 102 is deactivated. The OR gate 103 generates SAMPLE CLOCK clock signal 36, which is substantially equal to PXCLK clock signal 34, to selectively activate the analog to digital converter arrangement 21.

In the event where the zoom signal 191 is activated, the gate 102 generates a zoom mode signal substantially similar to ZOOM CLOCK clock signal 136. Simultaneously, the gate 101 is deactivated. The OR gate 103 then generates the SAMPLE CLOCK clock signal 36, based on the zoom mode signal, to double the sampling rate for doubling the storage of each piece of pixel information converted from input analog data 119.

Considering now the video RAM memory 23 in greater detail, the memory 23 is connected to the microprocessor 29 by means not shown to control the storage of information in the memory 23, and is also connected between the analog to digital converter arrangement 21 and the output logic arrangement 24 to receive and store pixel data 21A before transferring the data to the output logic arrangement 24. The memory 23 has a storage capacity large enough to accommodate an image from a high resolution device, such as a workstation having a pixel array dimension of 1280×1024. In this regard, the microprocessor 29 detects the pixel array dimension of the input device image, such as image 18, and assigns an appropriate number of locations within the memory 23 to accommodate the image 18.

In operation, the memory 23 performs two different functions according to the mode of operation selected by the user. For example, in the restore mode, the microprocessor 29 clears the entire memory 23 to eliminate extraneous data previously stored in the memory 23. The microprocessor 29 then detects the array dimensions of the image 18.

In the preferred embodiment illustrated in FIG. 1, the image 18 has an array of 640×480 while panel 16 has an array of 1024×768. Once the microprocessor 29 detects the array dimensions of image 18, the microprocessor 29 determines the appropriate memory locations within the memory 23 necessary to recreate the image 16 within the memory 24. In this regard, the microprocessor 29 sets up a storage array within the memory 23 having the same dimensions as the panel 16, 1024×768. The portion of the array starting at column 193 to column 832, and row 1 to 480 are reserved by the microprocessor 29 for receiving the pixel data 21A, while the remaining columns and rows remain cleared.

During a single frame of video information, the sampling arrangement 20 converts the incoming analog data 119 into the pixel data 21A which is then stored in the reserved portion of the memory 23. In this way, the image 30 is stored in the memory 23, at the upper central portions of the 1024×768 array. The stored image 30 is then transferred to the panel 16, wherein the duplicate image 30 is positioned on panel 16 between columns 193 and 832, and rows 1 and 480 as shown in FIG. 2.

In the zoom mode, the microprocessor initially clears the entire memory 23. An array having dimensions of about 1280×512 is set aside in memory locations of the memory 23 to receive and store digital reproduction of the image 14, wherein the number of columns of pixel information from the image 14 has been doubled while the number of rows remains the same. In this regard, the microprocessor 29 reserves memory columns 1 to 1280 and rows 1 to 480 for storing the enlarged representation of image 14.

During a single frame of video information, the sampling arrangement 20 converts the incoming analog data 119 into the pixel data 21A, wherein the incoming pixel data 21A is sampled twice during the frame to enable the memory 23 to store each piece of pixel information twice. The pixel data 21A is stored in the reserved memory of memory 23 before being transferred to the output logic arrangement 24 for scaling to correspond to the array dimension of panel 16.

From the foregoing, it will be understood by one skilled in the art that the memory 23 provides a means for temporarily reproducing the final image 18 to be displayed on panel 16, including the empty space surrounding the image 30, before transferring it for display in the restore mode.

In the zoom mode, the memory 23 provides a means for temporarily reproducing the image 14 in an horizontally expanded manner, together with additional empty space below the image 30, to facilitate the scaling thereof to enable the array dimensions of the scaled reproduction of image 14 to substantially match the array dimensions of panel 16.

Figure 5:
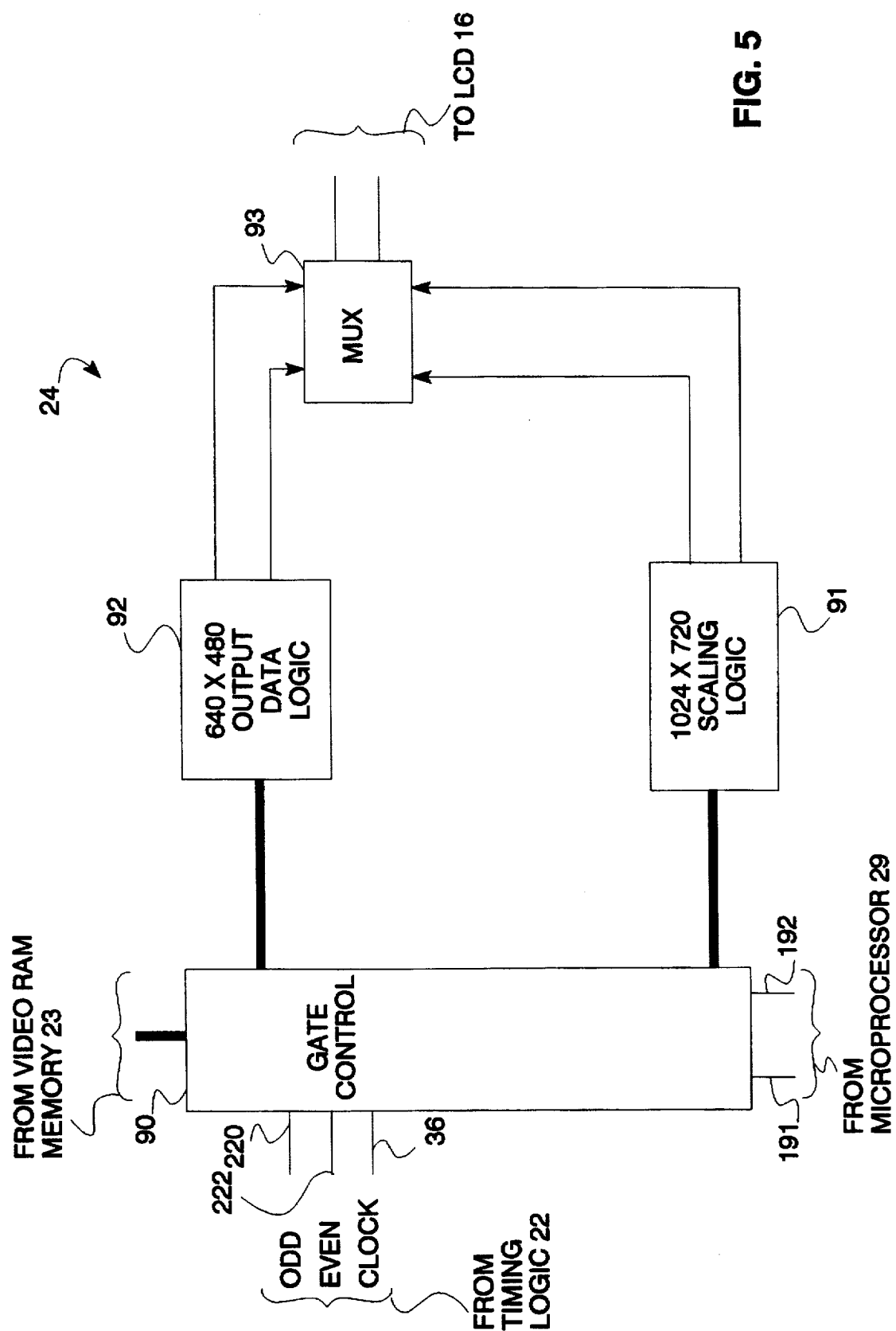
FIG. 5 is a block diagram of the output logic arrangement of FIG. 1.

Considering now the output logic arrangement 24 in greater detail with reference to FIGS. 1 and 5, the arrangement 24 generally includes a pair of output data logic units 91 and 92 for causing the pixel data retrieved from the video ram memory 23 to be displayed in the 640×480 or 1024×720 formats of the restore mode or the zoom mode, respectively. A gate control circuit 90 gates the pixel data information to one of the units 91 or 92 depending upon which operating mode has been selected. A multiplexer 93 controls the data passed by either the logic unit 91 or 92 to the display 16.

Figure 10:
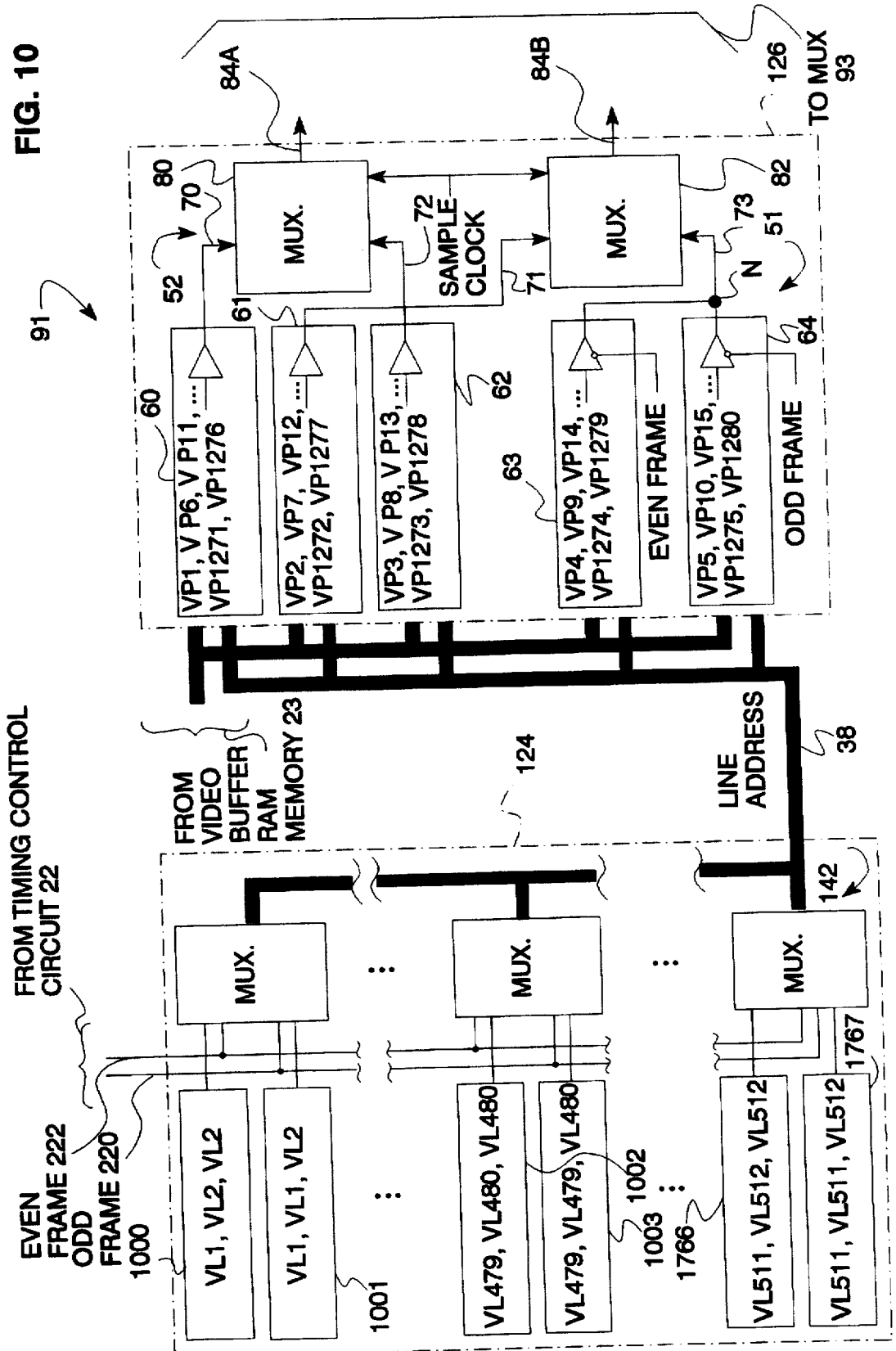
FIGS. 10 and 11 are block diagrams of the output data logic devices of FIG. 5.

Considering now the 1024×720 scaling logic unit 91 in greater detail with reference to FIG. 10, the unit 91 generally includes a row logic device or programmable logic device 124 and a column logic device 126 for scaling the horizontal and vertical pixel data, respectively.

As best seen in FIG. 10, the programmable logic device 124 generally includes a group of logic circuits 1000-1767 and a multiplexer arrangement 142 for generating a line address signal 38 for causing the lines or rows of the image to be scaled from n lines to N lines. In a preferred form of the invention, the logic circuits 1000-1767 are embodied in gate array logic.

The logic circuits 1000-1767 are arranged to cause certain lines or rows of pixel image data in the computer monitor-based image 14 to be repeated every odd frame cycle. During every even frame cycle, certain other lines or rows of pixel image data are repeated. Combining the odd frame cycle with the even frame cycle in an alternating manner causes some of the repeated lines from each cycle to overlap, thereby increasing the number of lines from n lines to N lines.

For example, logic circuit 1000 causes the line information stored in the memory 23 at line 2 or VL2 to be displayed twice, while the line information stored in memory 23 at line 1 or VL1 is displayed only once during an even frame cycle. During the subsequent odd frame cycle, logic circuit 1001 causes the line information stored in the memory 23 at line 1 or VL1 to be displayed twice, while the line information stored at line 2 or VL2 of the memory 23 is displayed only once.

In this way, the first three lines of information displayed on panel 16 comprise lines VL1, VL2 and VL2, respectively, during the even frame cycle. In the subsequent odd frame cycle, the first three lines of information displayed on panel 16 comprise VL1, VL1 and VL2, respectively.

Thus, when the even frame cycle is combined with the odd frame cycle, three lines of information are generated from two stored lines of information. In this regard, the second line of the group of three lines displayed alternates between VL1 and VL2. As the human eye cannot discern the difference due to the frequency of the even and odd frame cycle, VL1 and VL2 of the second displayed line appear to coalesce into one line, without any tearing effect.

This pattern of repeating one of two lines to display a total of three lines during an even frame cycle, and repeating the other line to also display a total of three lines during an odd frame cycle, is repeated for subsequent pairs of line information until a total of 768 lines are displayed. In this regard, logic circuits 1002 and 1003 repeat lines VL479 and VL480 in the same fashion. As discussed previously, the memory 23 stores 480 lines of information. Thus, by utilizing the above described method of repeating and combining to convert two lines of information into three lines of displayed information, converting the 480 lines of stored information will result in only 720 lines of displayed lines of information, less than the 768 lines available on the panel 16.

In order to address the remaining 48 lines of panel 16, lines VL481 through VL512 of memory 23 which were initially cleared by the microprocessor 29 are also converted by the same method to provide line information to address the remaining 48 lines of panel 16. As seen in FIG. 10, logic circuits 1766 and 1767 provide the final three lines of the 768 lines which can be displayed by panel 16.

Figure 9:
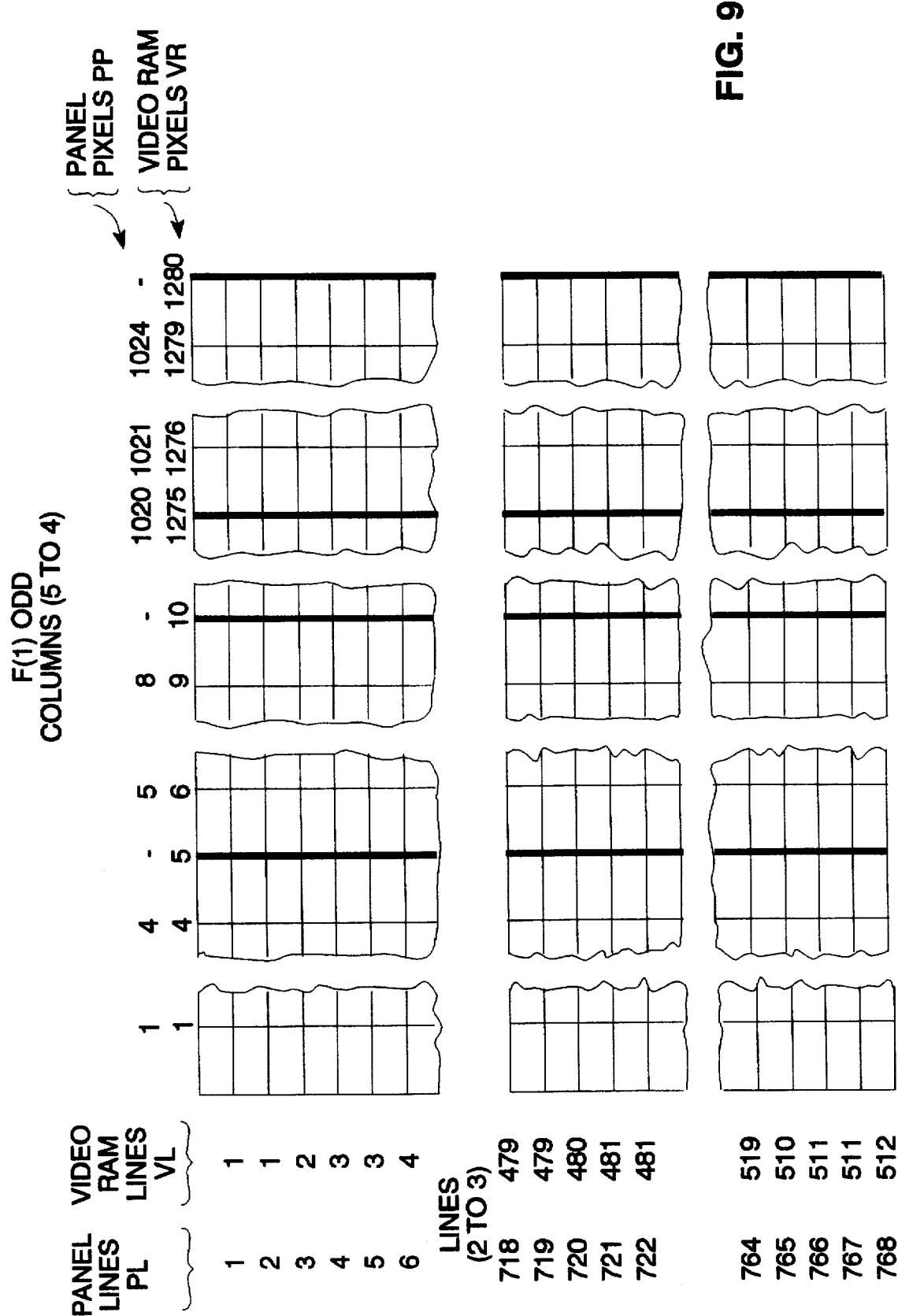

Referring now to FIGS. 8 and 9, the repeating and combining of lines or rows of pixel image data is illustrated diagrammatically in greater detail.

FIG. 8 illustrates the pixel and line information generated by scaling logic unit 91 for display on panel 16 during an even frame cycle. In this regard, the left side of the diagram contains two vertical columns which identify the associated line or row. The innermost column is identified by VIDEO RAM LINES VL which represents the line number as it is stored in the memory 23. The outermost column is identified by PANEL LINES PL which represents the line number of the panel 16 that is displayed.

As discussed previously, logic circuit 1000 of FIG. 10 displays VL1, VL2 and VL2 as the first three display lines of panel 16 during the even frame cycle. This same display of lines VL1, VL2 and VL2 is shown in FIG. 8, together with the corresponding displayed lines PL1, PL2 and PL3 of panel 16. The pattern is repeated until lines VL511, VL512 and VL512 are displayed on panel 16 as lines PL766, PL767 and PL768.

Similarly, FIG. 9 illustrates the pixel and line information generated by scaling logic unit 91 for display on panel 16 during an odd frame cycle, and includes the same headings. However, during the odd frame cycle, the odd numbered lines stored in the memory 23 are repeated instead of the even numbed lines.

In order to enable the line information stored in the memory 23 to be expanded to match the capability of panel 16, the multiplexer arrangement 142 generally includes a plurality of groups of line address pair circuits. In this regard, the even frame time logic for gating lines VL1, VL2, VL2 is multiplexed with the odd frame time logic for gating lines VL1, VL1, VL3 to permit stored lines VL1 and VL2 to be expanded into displayed lines PL1, PL2, and PL3. In other words, the stored lines are increased for display purposes by a ratio of 2 to 3.

From the foregoing, it will be understood by those skilled in the art that the multiplexer arrangement 142 includes a plurality of line address drivers (not shown) which are coupled to column logic device 126 by an address buss line 38.

Considering now the column logic 126 in greater detail with reference to FIG. 10, the column logic 126 generally includes a set 51 of frame memory 23 devices coupled to the address buss line 38 and a set 52 of multiplexers 80, 82 for assembling output data. The set 51 of frame memory 23 devices are responsive to pixel data retrieved from the memory 23 as well as the line address signals generated by the programmable logic device 124. In this regard, the set 51 of frame memory 23 devices enables certain adjacent columns of pixel image data to be averaged together over every two frame cycles to form sets of single pixel image columns.

Considering now the set 51 of frame memory 23 devices in greater detail, the set 51 of devices generally includes a group of logic circuits 60-64 for generating scaling signals 70-73 for causing the horizontal portion of the image to be scaled from 1280 lines to 1024 lines.

The logic circuits 60-64 are arranged to cause certain columns of pixel image data stored in the memory 23 to be eliminated during every odd frame cycle and certain other columns of stored pixel image data to be eliminated during every even frame cycle. The two sets of eliminated columns are thus averaged together, to cause the number of columns to be compressed from 1280 columns to 1024 columns.

Referring now to FIGS. 8 and 9, the averaging of columns of pixel image data is illustrated in greater detail. FIGS. 8 and 9 include two rows of pixel information identification, VIDEO RAM PIXELS VP and PANEL PIXELS PP, to identify the stored column of pixel information and the column of pixel information displayed, respectively. In both of FIGS. 8 and 9, columns of pixel information stored in the memory 23 which are not displayed on panel 16 during a particular frame cycle are marked with a heavy line.

In FIG. 8, during an even frame time cycle, one out of five columns of pixel image data is eliminated or not displayed. In this regard, stored columns VL4, VL9, VL14 ... VL1279 are eliminated. In FIG. 9, during the odd frame time cycle, adjacent columns of stored pixel image data are eliminated. Thus, stored columns VL5, VL10, VL15 ... VL1280 are eliminated.

As illustrated in FIGS. 8 and 9, column VL4 is not displayed during the even frame cycle while stored column VL5 is displayed as pixel column PP4 of panel 16. During the odd frame cycle, stored column VL5 is not displayed while the column VL4 is displayed as pixel column PP4. In this way, stored columns VL4 and VL5 alternate as displayed column PP4 allowing the viewer to perceive the resulting image as a combination of both columns VL4 and VL5. This pattern is repeated for all groups of five pixel columns, thereby permitting the columns to be scaled down from 1280 to 1024 columns. Because the entire computer image is displayed every two frame cycles, the resulting image is displayed flicker free and without causing any substantial stripping or tearing.

Considering now the set 52 of multiplexers, the set 52 generally includes a pair of multiplexer devices 80 and 82 for sending pairs of pixel data information to the liquid crystal display unit 16. In this regard, the set 52 of multiplexer devices includes multiplexer device 80 coupled to the output of the logic circuits 60 and 62, and a multiplexer device 82 coupled to the output of the logic circuits 61, 63 and 64. The output signals from drivers 63 and 64 are connected together at a common node N and are coupled to the multiplexer 82.

Considering now the logic circuits 60-64 in greater detail with reference to FIG. 5, the logic circuits 60-64 control scaling for the columns indicated in Table I.

TABLE I

| Logic Circuit Character Reference | Columns Controlled by Logic Circuit |
|---|---|
| (60) | 1, 6, 11, 16, 21, ..., 1276 |
| (61) | 2, 7, 12, 17, 22, ..., 1277 |
| (62) | 3, 8, 13, 18, 23, ..., 1278 |
| (63) | 4, 9, 14, 19, 24, ..., 1279 |
| (64) | 5, 10, 15, 20, 25, ..., 1280 |

From Table I, it will be understood by those skilled in the art that column pixel image data controlled by logic circuits 63 and 64 facilitates the scaling of stored pixel image data columns from 1280 to 1024 columns of displayed pixel image data.

In this regard, the scaling down of pixel image data from 1280 to 1024 requires a scaling down ratio of five to four. Thus, by eliminating one column of stored pixel data information per each group of five columns, the desired scaling will be achieved. Furthermore, by alternating adjacent columns to be eliminated, continuity between non-eliminated columns is maintained, thereby reducing any tearing effect a viewer might observe.

As best seen in FIG. 10, in order to control column scaling, the output drivers of logic circuits 64 and 63 are enabled by a pair of logic signals, an ODD FRAME signal 220 and an EVEN FRAME signal 222. Logic signals 220 and 222 are generated by a frame counter 45 (FIG. 4) and are indicative of an ODD frame time period and an EVEN frame time period, respectively. The frame counter for generating the ODD FRAME signal 220 and the EVEN FRAME signal 222 is conventional flip flops (not shown) and will not be described herein.

When the ODD FRAME signal 220 is a logical high, column driver 64 is disabled and column driver 63 is enabled. Similarly, when the EVEN FRAME signal 222 is a logical high, column driver 63 is disabled and column driver 64 is enabled. In this way, the fourth and fifth columns of each group of five stored pixel columns can be eliminated alternately, depending on whether an odd or even frame cycle is occurring.

Figure 11:
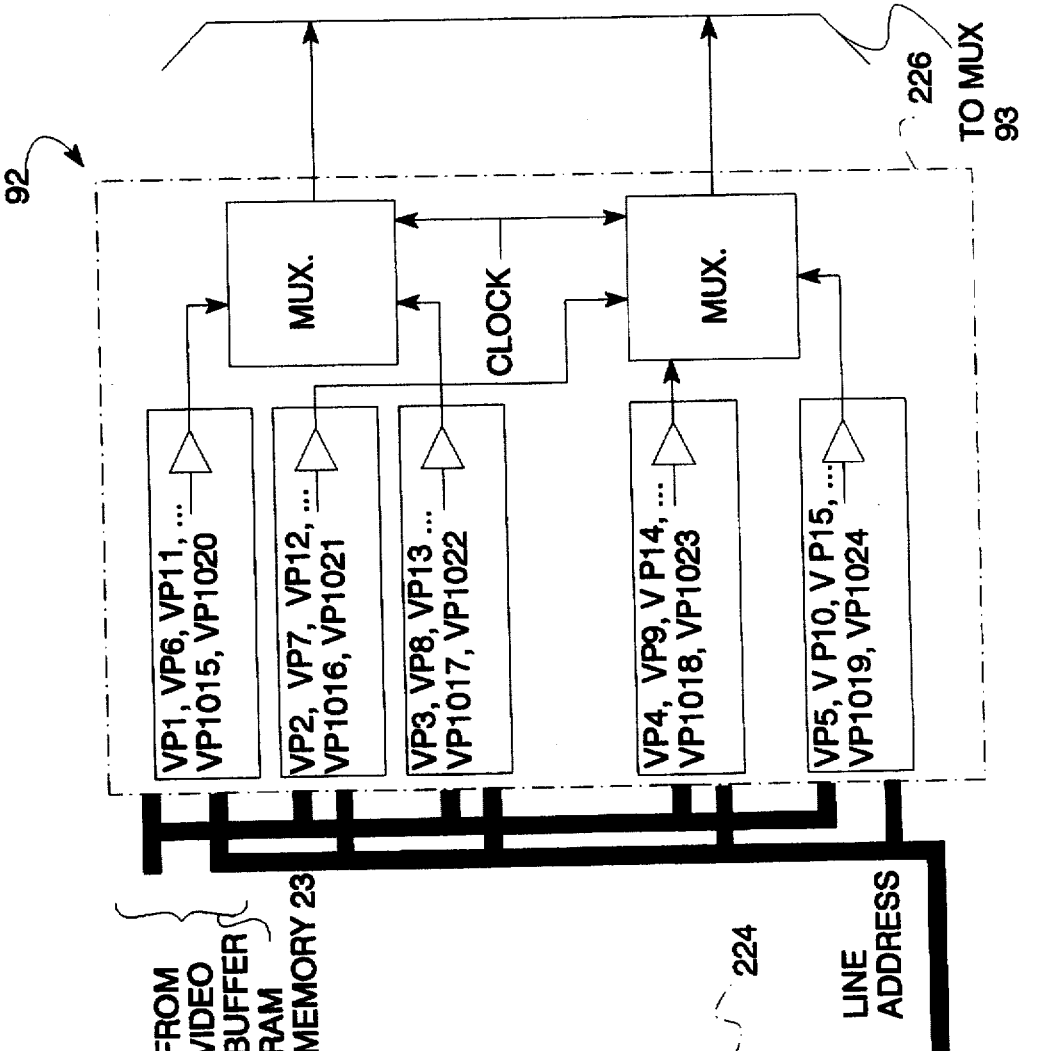

Considering now the 640×480 output data logic unit 92 in greater detail with reference to FIGS. 5 and 11, the output data logic unit 92 is similar to the scaling logic unit 91 and includes a row logic device 224 connected to a column logic device 226 by a line address bus. The row logic device 224 includes a group of logic circuits and multiplexers similar to those of row logic device 124. The column logic device 226 includes a set of frame memory 23 devices and a set of multiplexers similar to those of column logic device 126. However, unlike the row logic device 124, the row logic device 224 does not perform a scaling function. In this regard, the row logic device 224 merely retrieves stored line information from the memory 23 and transmits the line information to the panel 16 unchanged. Similarly, column logic device 226 merely retrieves stored pixel information from the memory 23 and transmits the pixel information to the panel 16 unchanged.

From the foregoing, it will be understood by one skilled in the art that output data logic unit 92 facilitates the transfer of the image 14, as it is stored in the memory 23, from the memory 23 to the panel 16, where the image 30 is displayed as a result.

Attached to this disclosure, and identified as Appendix A is a listing of the gate array logic utilized in an actual system of the present invention which was built and tested, and which employed ALTERA'S Advanced Hardware Descriptive Language (AHDL).

While particular embodiments of the present invention have been disclosed, it is to be understood that various different modifications are possible and are contemplated within the true spirit and scope of the appended claims. There is no intention, therefore, of limitations to the exact abstract or disclosure herein presented.

APPENDIX A

```
% Memory address bits 8 & 9 of the Frame Buffer %
TITLE " LCD Vertical Counter Address Bit 0 & 1 ";        % Hung Nguyen 3/18/94 %
SUBDESIGN lvcntb01
(
clk,/clr, preview, zoom, vgamode           : INPUT;
cout, vertadb1, vertadb0                   : OUTPUT;
)
VARIABLE
        evenfrm                            : DFF;
        control:MACHINE OF BITS (s1,s0,vertadb1,vertadb0)
                WITH STATES (
                        idle    = B"0000",
                        zom1    = B"0010",
                        zom2    = B"1000",
                        upc1    = B"0100",
                        upc2    = B"0101",
                        upc3    = B"0110",
                        upc4    = B"0111");
BEGIN
        evenfrm.clk = /clr;
        control.clk = clk;
        control.reset = !clr;
        evenfrm = !evenfrm;   % an even frame bit ON/OFF %
                              % active high bit %
        CASE control IS
                WHEN idle =>
                                control = upc1;
                WHEN upc1 => cout    = GND;
                                IF zoom & preview THEN control = zom1;   % Zoom
mode for VGA and Video %
                                ELSIF zoom & !preview THEN control = zom2;
                                ELSIF vgamode THEN control = upc3;
                                ELSE control upc2;
                                END IF;
                WHEN upc2 => IF preview & !evenfrm THEN control = upc4;
                                ELSE control = upc3;       % preview mode
and accessing odd frame %
                                END IF;
                WHEN upc3 => IF preview & evenfrm # zoom # vgamode THEN
                                        control = upc1;    % zoom mode or
%
                                        cout = VCC;
```

APPENDIX A-continued

```
% preview mode and accessing even frame %
                                ELSE control = upc4;
                                END IF;
        WHEN upc4 => control = upc1;
                                cout = VCC;
        WHEN zom1 =>    control = upc3;
                                cout = GND;
        WHEN zom2 =>    control = zom1;
                                cout = GND;
    END CASE;
END;
% Memory address bits 10-17 of Frame Buffer %
TITLE " LCD Vertical Counter Address"; % Hung Nguyen 1/18/94 %
SUBDESIGN lcdvcnt2
(
clk, en,/clr                    :INPUT;
q[7 . . . 0]                                            :OUTPUT;
)
VARIABLE
        count [7 . . . 0]                       : DFF;
BEGIN
        count[].clk = clk;
        count[].clrn = /clr;
        IF en & (count[] < H"FF") THEN count[] = count[] + 1;
                ELSE count[] = count[];
                END IF;
        q[]= count[];
END;
% Memory Address bits 0-7 of Frame Buffer %
TITLE " LCD Horizontal Counter Address"; % Hung Nguyen 05/20/93 %
SUBDESIGN zlcdhcnt
(
clk,/clr, up/dn                         : INPUT;
cout, q[7 . . . 0]                      : OUTPUT;
)
VARIABLE
        count [7 . . . 0]       : DFF;
BEGIN
        count[].clk = clk;
        count[].clrn = /clr;
        IF up/dn THEN
                count[] = count[] + 1 ;
                IF count[] = H"FF" THEN cout = vcc;
                END IF;
        ELSE
                count[] = count[] - 1 ;
                IF count[] = H"0" THEN cout = vcc;
                END IF;
        END IF;
        q[] = count[] ;
END;
```

What is claimed is:

1. A display method for use with a display device having a display resolution size and at least one video signal source for generating video signals indicative of a video image having a video resolution size, comprising:

provided a timing signal;

storing temporarily the video signals indicative of the video image according to said timing signal;

adjusting the video signals in response to said timing signal to scale the video image in one dimension only for storing the adjusted video signals as stored image information indicative of a stored image having a stored image resolution size;

retrieving said stored image information;

adjusting continuously the retrieved stored image information to cause said adjusted stored image information to be indicative of a scaled image having a scaled resolution size which is about equal to the display resolution size in said one dimension and another dimension for displaying said scaled image on the display device;

said adjusting includes selectively repeating certain ones of the retrieved stored image information indicative of certain ones of the rows or columns of pixel information for the stored image to further scale up said stored image resolution size continuously in said one dimension;

said adjusting further includes selectively eliminating certain other ones of the retrieved stored image information indicative of certain other ones of the rows or columns of pixel information for the stored image to help scale down said stored image resolution size continuously in said another dimension; and whereby said stored image resolution size is substantially simultaneously scaled up in said one dimension and scaled down in said another dimension to enable said video image to be enlarged for display on the display device.

2. A display method according to claim 1, wherein said adjusting further includes:

selectively repeating certain further ones of the retrieved stored image information indicative of certain further ones of the rows or columns of pixel information for the stored image to further scale up said stored image resolution size continuously in said one dimension during an alternate frame period; and selectively eliminating certain additional ones of the retrieved stored image information indicative of certain additional ones of the rows or columns of pixel information for the stored image to help scale down said stored image resolution size continuously in said another dimension during said alternate frame period.

3. A display method according to claim 1, wherein said adjusting includes increasing the frequency of a clock signal to generate said timing signal for the purpose of increasing the stored image resolution size in said one dimension only.

4. A display system for use with a display device having a display resolution size and at least one video signal source for generating video signals indicative of a video image having a video resolution size, comprising:

means for providing a timing signal;

means for storing temporarily the video signals indicative of the video image according to said timing signal;

sampling means for adjusting the video signals in response to said timing signal to scale the video image in one dimension only for storing the adjusted video signals as stored image information indicative of a stored image having a stored image resolution size;

means for retrieving said stored image information;

logic means for adjusting continuously the retrieved stored image information to cause said adjusted stored image information to be indicative of a scaled image having a scaled resolution size which is about equal to the display resolution size in said one dimension and another dimension for displaying said scaled image on the display device;

said logic means includes means for selectively repeating certain ones of the retrieved stored image information indicative of certain ones of the rows or columns of pixel information for the stored image to further scale up said stored image resolution size continuously in said one dimension;

said logic means further includes means for selectively eliminating certain other ones of the retrieved stored image information indicative of certain other ones of the rows or columns of pixel information for the stored image to help scale down said stored image resolution size continuously in said another dimension; and whereby said stored image resolution size is substantially simultaneously scaled up in said one dimension and scaled down in said another dimension to enable said video image to be enlarged for display on the display device.

5. A display system according to claim 4, wherein said logic means further includes:

means for selectively repeating certain further ones of the retrieved stored image information indicative of certain further ones of the rows or columns of pixel information for the stored image to further scale up said stored image resolution size continuously in said one dimension during an alternate frame period; and means for selectively eliminating certain additional ones of the retrieved stored image information indicative of certain additional ones of the rows or columns of pixel information for the stored image to help scale down said stored image resolution size continuously in said another dimension during said alternate frame period.

6. A display system according to claim 5, wherein said sampling means includes means for increasing the frequency of a clock signal to generate said timing signal for the purpose of increasing the stored image resolution size in said one dimension only.

7. A display system according to claim 4, further including:

data input means for generating a scaling command to facilitate the scaling of the video signals for adjusting them, wherein said scaled image resolution size is defined by a matrix array of the scaled image arranged in N number of rows in said another dimension and M number of columns in said one dimension;

wherein said stored image resolution size is defined by a matrix array of the stored image arranged in n number of rows in said another dimension and m number of columns in said one dimension;

wherein said repeating means includes row gating means responsive to said timing signals and to said data input means for generating row scaling signals to cause the n number of rows of stored pixel information to expand to the N number of rows of scaled pixel information in said another dimension; and wherein said eliminating means includes column gating means responsive to said data input means and to said timing signals for generating column signals to cause the m number of columns of stored pixel information to be reduced to the M number of columns of scaled pixel information in said one dimension;

whereby said video signal indicative of a video image is converted into said stored image for helping to cause said scaled image to be displayed, where said scaled image is defined by a matrix array of pixel information arranged in N number of rows in said another dimension and M number of columns in said one dimension, where N is substantially larger than n and where M is substantially smaller than m.

8. A display system according to claim 7, further including frame time means means for generating a series of alternating frame time signals indicative of odd frame time periods and even frame time periods.

9. A display system according to claim 8, wherein said column gating means includes column control means for adjusting the pixel image information indicative of pixel images in every X number of columns during even frame time periods and for adjusting the pixel image information indicative of pixel images in every X-1 number of columns during odd frame time periods.

10. A display system according to claim 8, wherein said row gating means includes row control means for duplicating the pixel information indicative of pixel images in every Y number of the n number of rows during even frame time periods and for duplicating the pixel information indicative of pixel images in every Y-1 number of the n number of rows during odd frame time periods.

11. A display system according to claim 7, wherein the image is adjusted by initially increasing the column size of the stored image, by compressing subsequently the increased column size of the stored image to the scaled image continuously as it is being projected, and by expanding subsequently the row size of the stored image continuously to the scaled image as it is being projected.

12. A control system for adjusting the initial size of an image defined by columns and rows to be displayed, comprising:

command means generating a scale command for causing the image to be scaled to a desired size substantially larger than the initial size;

sampling means responsive to said scale command for increasing the image in one dimension only by greatly increasing the number of the initial image columns to provide an initial adjustment of the size of the image to an intermediate size substantially larger than said desired size in said one dimension only;

storage means responsive to the initially adjusted image for storing it temporarily;

control means responsive to the stored initially adjusted image for decreasing the number of the intermediate image columns to be displayed to adjust further the image to said desired size in said one dimension only; and logic means for inhibiting the display of one of the intermediate image columns and enabling the display of another one of the intermediate image columns during an even frame time, and for inhibiting the display of said another one of the intermediate image columns and enabling the display of said one of the intermediate image columns during an odd frame time;

wherein the display of said one intermediate image column and said another one of the intermediate image columns is averaged over said even frame time and said odd frame time to display the image at said desired size substantially without flicker.

13. A control system according to claim 12, further including a display device for displaying the desired image.

14. A control system according to claim 13, further including processing means responsive to said display device for determining the required memory locations in said storing means for storing the stored initially adjusted image.

15. A control system according to claim 14, wherein said processing means further includes means for clearing additional memory locations adjacent to said memory locations required to store the initially adjusted image to help control the display of the portions of said display image that do not correspond to the image.

16. A display system according to claim 12, wherein said command means further includes means for generating a restore command to cause the image to be stored temporarily in said storage means for enabling the stored image to be substantially duplicated in full size as a portion of said desired image.

17. A display system according to claim 16, wherein said desired image portion is an upper central portion.

18. A control system for adjusting the size of an image to be displayed, comprising:

command means generating a scale command for causing the image to be scaled to a desired size;

sampling means responsive to said scale command for scaling the image in one dimension only, to provide an initial adjustment of the size of the image in said one dimension only;

said storage means responsive to the initially adjusted image for storing it temporarily;

control means further responsive to the stored initially adjusted image for scaling the initially adjusted image to adjust further the image to said desired size in said one dimension only;

said control means further responsive to the stored initially adjusted image for scaling the initially adjusted image in another dimension only, to adjust the image to said desired size in said another dimension;

wherein said sampling means expands the image size in said one dimension; and logic means for inhibiting alternatingly the display of the initially adjusted image in said one dimension, and for alternately repeating the display of the initially adjusted image in said another dimension, over an even frame time and an odd frame time to enable the display of the initially adjusted image to be averaged over said even frame time and said odd frame time;

wherein the averaged display of the initially adjusted image corresponds to said desired size and is perceived substantially without flicker.

19. A control system according to claim 18, wherein said sampling means includes means for doubling the image size in said one dimension.

20. A control system for adjusting the size of an image to be displayed, comprising:

command means generating a scale command for causing the image to be scaled to a desired size;

sampling means responsive to said scale command for scaling the image in one dimension only, to provide an initial adjustment of the size of the image in said one dimension only;

storage means responsive to the initially adjusted image for storing it temporarily;

control means responsive to the stored initially adjusted image for further scaling the initially adjusted image to adjust further the image to said desired size in said one dimension only;

said control means further responsive to the stored initially adjusted image for scaling the initially adjusted image in another dimension only, to adjust the image to said desired size in said another dimension; and wherein said control means includes column scaling means for inhibiting the display of a portion of the initially adjusted image in said one dimension during an even frame time, and for inhibiting the display of another portion of the initially adjusted image in said one dimension during an odd frame time, to enable the size of the initially adjusted image to correspond to the desired size in said one dimension during said even frame time and said odd frame time;

wherein the display of said initially adjusted image is averaged over said even frame time and said odd frame time to enable the image to be displayed at said desired size substantially without flicker.

21. A control system according to claim 20, wherein said column scaling mean further includes means for eliminating selected columns of the stored initially adjusted image in said one dimension.

22. A control system according to claim 21, wherein said column scaling means compresses the stored initially adjusted image to said desired image in said one dimension by a compression ratio.

23. A control system according to claim 20, wherein said control means further includes row scaling means for expanding the stored initially adjusted image in said another dimension.

24. A control system according to claim 23, wherein said row scaling means further includes means for repeating selected rows of the stored initially adjusted image in said another dimension.

25. A control system according to claim 24, wherein said row scaling means expands the stored initially adjusted image to said desired image in said another dimension by an expansion ratio.

26. A control system according to claim 23, wherein the image size is scaled from about a 640×480 matrix array to said desired image size of about a 1024×720 matrix array.

27. A control system according to claim 23, wherein said one dimension is a horizontal dimension.

28. A control system according to claim 27, wherein said another dimension is a vertical dimension.

* * * * *